United States Patent
Bolz et al.

(10) Patent No.: US 6,901,326 B2
(45) Date of Patent: May 31, 2005

(54) CIRCUIT LAYOUT AND PROCEDURE TO CONTROL AT LEAST ONE ELECTRICAL COMPONENT OF A MOTOR VEHICLE

(75) Inventors: Stephan Bolz, Pfatter (DE); Günter Lugent, Regensburg (DE); Mauricio Eduardo Hernandez-Distancia, Lake Orion, MI (US)

(73) Assignees: Siemens Aktiengesellschaft, Munich (DE); Siemens VDO Automotive Corporation, Auburn Hills, MI (US)

(*) Notice: Subject to any disclaimer, the term of this patent is extended or adjusted under 35 U.S.C. 154(b) by 189 days.

(21) Appl. No.: 10/446,321

(22) Filed: May 28, 2003

(65) Prior Publication Data

US 2004/0243297 A1 Dec. 2, 2004

(51) Int. Cl.$^7$ ............................................... G06F 19/00
(52) U.S. Cl. ...................... 701/102; 701/114; 701/115; 327/143; 307/125; 307/130
(58) Field of Search ................................. 701/102, 114, 701/115; 327/143; 307/125, 130

(56) References Cited

U.S. PATENT DOCUMENTS

| | | | |
|---|---|---|---|
| 4,234,920 A | * 11/1980 | Van Ness et al. ............. 714/22 |
| 4,544,924 A | 10/1985 | French .................. 340/825.69 |
| 5,313,112 A | * 5/1994 | Macks ......................... 327/143 |
| 5,651,011 A | * 7/1997 | Keeth .......................... 714/724 |

FOREIGN PATENT DOCUMENTS

DE           101 06 132 A1    8/2002    ............. G05F/1/10

* cited by examiner

Primary Examiner—Tony M. Argenbright
Assistant Examiner—Johnny H. Hoang
(74) Attorney, Agent, or Firm—Baker Botts L.L.P.

(57) ABSTRACT

Circuit layout to control at least one electrical component of a motor vehicle via a control signal, wherein the circuit layout comprises a digital control unit that provides an output signal during its operation, the circuit layout has a supply terminal, and the digital control unit starts its operation when the supply terminal has an operating voltage above a predetermined threshold value. The digital control unit stops its operation when the supply terminal has an operating value below the threshold value, wherein the circuit layout comprises a circuit block in order to provide for the control signal, during the operation of the digital control unit the circuit block provides for the control signal based on the output signal of the digital control unit, and the circuit block maintains the momentary control signal for a predetermined period of time after the operation of the digital control unit is ended.

20 Claims, 3 Drawing Sheets

CIRCUIT LAYOUT AND PROCEDURE TO CONTROL AT LEAST ONE ELECTRICAL COMPONENT OF A MOTOR VEHICLE

TECHNICAL FIELD OF THE INVENTION

The present invention concerns a circuit layout and a procedure to control at least one electrical component of a motor vehicle. The invention especially concerns a so-called control device in a motor vehicle that carries out many control functions that are necessary for the proper operation of an internal combustion engine of the motor vehicle.

BACKGROUND OF THE INVENTION

Control devices of that kind are already known and in order to initiate them via a supply terminal an operating voltage from the 12V electrical system of the motor vehicle is supplied. Then the control functions are implemented in a so-called micro-controller that typically needs only a voltage of 5V for the operation. In this case the control device has a voltage regulator (DC/DC down converter) in order to convert the voltage of the electrical system from 12V to 5V. As long as the voltage of the electrical system is higher than approx. 6V, the voltage regulator can provide on its output the necessary voltage for the operation of the micro-controller.

Assigned electrical components have to be appropriately triggered when the internal combustion engine of a motor vehicle is started. When the motor is started, the control device is typically supplied via a terminal of the ignition lock with the voltage of the electrical system from a starter battery of the motor vehicle and then the voltage regulator in the control device supplies the micro-controller with 5V. After a short initialization phase the micro-controller starts its regular operation and activates for example a magnetic switch to turn on (starting and generating current) the starter. In case of an internal combustion engine with direct injection, a gasoline pump is started at the same time in order to build up the necessary fuel pressure for the first injection pulse.

It is problematic to carry out control functions when the motor is started, because at that time the necessary operating voltage to operate the control device cannot be provided by an electric generator assigned to the internal combustion engine but only via the starter battery of the motor vehicle. Bringing up the motor to its starting speed via the starter requires a considerable electrical power that has to be provided by the starter battery. The electric current that is taken up from the starter at the beginning of the starting procedure is especially high. In this moment the current is only limited by the internal resistance of the starter battery and the resistors of the feed lines and the starter winding. A counter-electromotive force that reduces the current is only generated with the run-up of the starter. When the motor is started, a strong drop of the voltage on the battery terminals occurs due to the internal resistance of the starter battery that is different from zero.

This temporary drop of the battery voltage can cause that the operating voltage supplied to the control device is temporarily not sufficient to reliably carry out the control functions. This problem is especially increased through a weakening of the starter battery caused by old age or through low temperatures. It turned out that the battery voltage (nominal 12V) can drop for example for a period of 100 ms to values of approx. 3V when the motor is started. In this case the operating voltage (if necessary down-converted) supplied to the control device is not sufficient anymore to guarantee a reliable operation of the control device, especially the operation of a possibly provided micro-controller.

SUMMARY OF THE INVENTION

Therefore the object of the present invention is to provide for a circuit layout and a procedure to control at least one electrical component of a motor vehicle with which even in case of a temporary drop of an operating voltage a control signal for the electrical component can be reliably provided.

This object of the invention is essentially solved in accordance with the invention that in case an operating voltage falls below a threshold value the momentary control signal is maintained for a predetermined period of time. This makes it possible to bridge the temporary outage of control functions.

The invention especially provides for: A circuit layout to control at least one electrical component of a motor vehicle via a control signal supplied to this component wherein the circuit layout comprises a digital control unit that provides during its operation for an output signal for providing a control signal on an output of the digital control unit, wherein the circuit layout has a supply terminal to set up an operating voltage that is provided by a power supply unit of the motor vehicle, wherein the digital control unit starts its operation when the supply terminal has an operating voltage above a predetermined threshold value. The digital control unit stops its operation when the supply terminal has an operating value below the threshold value wherein the circuit layout comprises a circuit block connected to the output of the digital control unit in order to provide for the control signal, wherein during the operation of the digital control unit the circuit block provides for the control signal based on the output signal of the digital control unit, and wherein the circuit block maintains the momentary control signal for a predetermined period of time after the operation of the digital control unit is ended. The invention also provides for a procedure to control at least one electrical component of a motor vehicle via a control signal supplied to this component, comprising:

Operation of a digital control unit for providing a control signal via an output signal of the digital control unit that starts its operation when an operating voltage above a predetermined threshold value is provided by a power supply unit of the motor vehicle and it stops its operation when an operating voltage below the threshold value is provided.

Input of the output signal to a circuit block.

Providing the control signal via the circuit block which provides during the operation of the digital control unit for the control signal based on the output signal of the digital control unit and maintaining the momentary control signal for a predetermined period of time after the operation of the digital control unit is ended.

In a preferred embodiment the triggered electrical component is a component connected to the operation of an internal combustion engine that has to be typically triggered with a start of the motor. In one embodiment it is a magnetic actuator, especially a magnetic switch of a starter for an internal combustion engine, a fuel pump or a relay, especially a relay to turn on an electrical consumer load of a comparably high electrical power. This means that when turning on such a consumer load, then the strain on the electrical system is so high that the voltage of the electrical system can be considerably reduced, for example at least for 50%, and especially to a value that does no longer guarantee providing a proper control signal through the digital control unit.

Another example for an electrical component for which the triggering could be provided is an electrohydraulic high-pressure valve system (for example for a diesel injection engine). In this case an immediate actuation of the valves is desirable starting speed is reached.

In one embodiment a binary signal is provided as the control signal to turn the electrical component on and off.

The digital control unit controls a major part of the electrical components, especially all electrical components that are necessary to start and operate an internal combustion engine in the motor vehicle. For this purpose many sensor signals can be entered into the digital control unit in order to control or regulate the components. In order to carry out these very complex control functions in practical operation, it is advantageous if the digital control unit functions program-controlled, especially if it is developed as a micro-controller. In case the operation of the digital control unit requires a voltage that is different from the voltage of the electrical system, the circuit layout preferably comprises a DC/DC converter to provide for this voltage.

Especially with a program-controlled digital control unit an exceeding of the threshold value through the operating voltage does not immediately lead to a control operation of the control unit. Rather such a control unit is then first initialized. In a preferred embodiment in which the digital control unit starts its operation just at the end of an initialization phase, it is provided that the term of the predetermined period of time is longer than the term of the initialization phase and especially longer as the sum of the term of the initialization phase and the typically occurring term when the motor is started for which the operating voltage is below the threshold value. In practical operation the term of the predetermined period of time can for example amount to the double or quintuple of the term of the initialization phase in order to bridge the temporary outage of the control functions.

In many cases it is desirable to actuate the electrical component immediately after setting up the operating voltage. An example would be the triggering of a fuel pump when the motor is started. If the fuel pump is immediately activated, the required time for the initialization of the digital control unit is saved and so the process of starting the motor can be accelerated. Therefore it is provided in another embodiment, that the circuit block is developed in a way that when the operating voltage exceeds the threshold value a predefined control signal is provided for a term that is at least as long as the term of the initialization phase.

In one embodiment the power supply unit of the motor vehicle is built up from a starter battery of the motor vehicle or with a connected switchgear to start the motor, such as the above mentioned ignition lock.

In a constructively especially simple embodiment the circuit block provides for the control signal on a channel terminal (source or drain) of a field effect transistor (FET) whose gate voltage is controlled via the output signal of the digital control unit. A capacitor with a parallel connected discharge passage, especially an ohmic resistor, can be provided on the gate terminal of a FET in order to provide for the gate voltage during the predetermined period of time. Therefore the period of time can be easily predetermined through the selection of the electric resistance of the discharge passage or the dimensioning of the FET (the period of time ends when the discharged capacitor voltage falls below the threshold voltage of the FET). Another transistor can be provided in order to charge this capacitor from the operating voltage. A control terminal of this other transistor can be supplied with the output signal of the digital control unit. If this other transistor is a bipolar transistor another capacitor can be provided to charge this other capacitor via its controlled system (for example emitter-to-base system) when the operating voltage is set up and to make the transistor conductive for a predetermined period of time which is sufficient to charge the first mentioned capacitor. This other capacitor can for example be discharged via a diode in case of a drop of the operating voltage below the threshold value in order to carry out the same function when the starting process is repeated (rise of the operating value above the threshold value).

DESCRIPTION OF THE PREFERRED EMBODIMENTS

Figure 1:
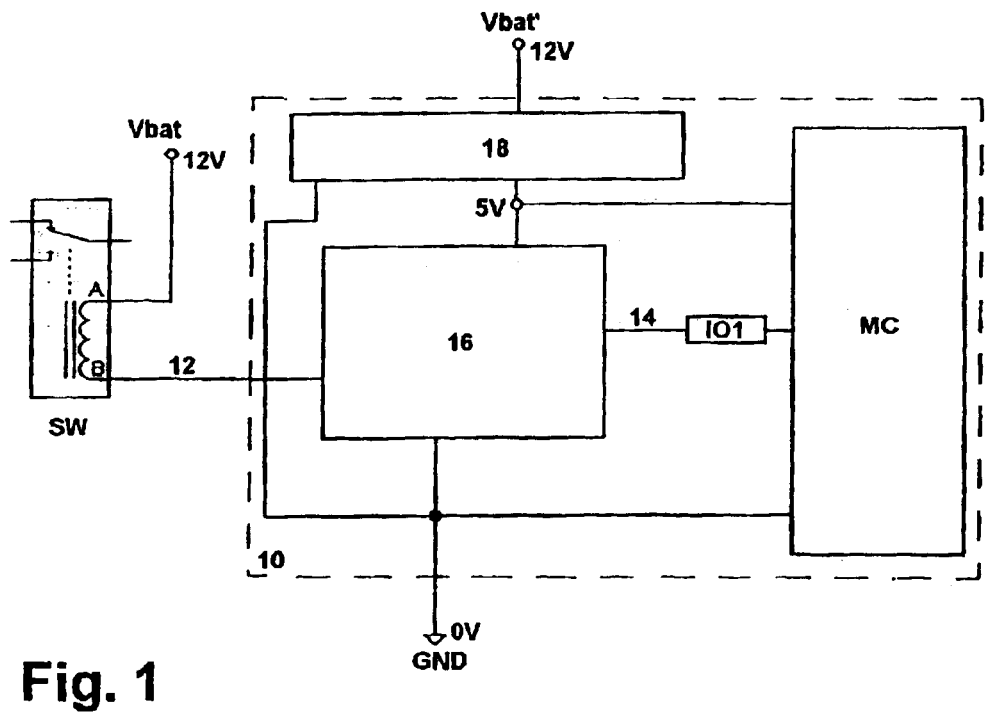
FIG. 1 is a block diagram of a circuit layout in accordance with the invention and in accordance with a first embodiment.

FIG. 1 is a block diagram of a circuit layout 10 to control a controllable switch SW that is in this example a relay for the fuel pump (not outlined) of a motor vehicle. This component SW of the vehicle electricity is supplied with a control signal through the circuit layout 10 via a line 12.

In order to define this control signal, the circuit layout 10 comprises a micro-controller MC that provides in its operation for an output signal on an output 101 and feeds it via a line 14 to a circuit block 16 that provides for the control signal on line 12 on an output.

An operating voltage of 12V is supplied to the circuit layout 10 via a supply terminal Vbat' when the circuit layout shall be operated. This operating voltage is the voltage of a (not shown) starter battery of the motor vehicle and the voltage is typically performed via an ignition lock when the ignition on supply terminal Vbat' is turned on. Independently of this action the battery voltage of 12V is directly led via a terminal Vbat to a terminal A of the controllable switch SW whose second terminal B is supplied with the control signal via line 12. In the shown example, a voltage of 0V is given out via line 12 when the motor is started so that the fuel pump is turned on via switch SW.

In the outlined example, the micro-controller MC is supplied with a voltage of 5V which is provided on an output of a voltage regulator 18 for the micro-controller MC and the circuit block 16. For this purpose, the voltage regulator 18 is connected with the supply terminal Vbat' and with a ground terminal GND.

If the supply terminal Vbat' has an operating voltage above 6V (threshold value) or if the present operating voltage exceeds this threshold value, the voltage regulator 18 is able to provide for the voltage of 5V that is required to operate the micro-controller and the micro-controller MC starts its operation after an initialization phase (for example 50 ms). Then the micro-controller MC provides for an output signal on its output I01 which causes circuit block 16 to give out a control signal corresponding to this output signal via line 12 in order to turn on switch SW. As long as the micro-controller MC is in operation, the circuit block 16 provides for the control signal based on the output signal of the micro-controller.

If the present voltage on supply terminal Vbat' falls below 6V, which can especially happen during the start of a motor, the voltage regulator 18 can no longer provide for the voltage of 5V on its output that is required for the operation of the micro-controller MC, and the micro-controller changes into a reset mode in which, depending on the design of the micro-controller, the output signal on output I01 changes for example to a high-resistance condition so that the required control signal is not defined by the output signal of the micro-controller.

In such a phase of a too low operating voltage ("undervoltage"), which can happen in practical operation through the turning on of a consumer load with a momentarily very high power requirement and which often happens only temporarily, the circuit block 16 provides as follows for maintaining the last defined control signal of the micro-controller MC for a predetermined period of time. This period of time is in this connection dimensioned in a way that the bridging of this undefined condition is carried out for at least a term that equals the sum of the term of the undervoltage phase to be expected in practical operation and the term of the initialization phase of the micro-controller.

Through a suitable design of circuit block 16 the following advantageous measures can be realized, individually or combined:

a) The predetermined period of time should not essentially exceed the typical undervoltage term plus initialization term, especially shorter than the double of this sum, because otherwise an undesirable delay occurs when the operating voltage on the supply terminal Vbat' (motor stop) is turned off. Such an automatic turning-off of the bridging is also advantageous in the case that the used micro-controller, for example due to a software failure, does not return from a reset condition to a normal operating condition. In the outlined example an uncontrolled operation of the fuel pump is avoided if this failure occurs.

b) At least for the term of the bridging the circuit block 16 should still function with a very low supply voltage or totally independent from the operating voltage supplied to the circuit layout 10. This can be easily achieved via an arrangement of an energy storage in circuit block 16 that can be charged for example during the normal operation.

c) In some cases, for example if the triggered component (see outlined example) is the fuel pump relay of an internal combustion engine, it is advantageous if circuit block 16 actuates this component immediately after setting up the operating voltage, i.e. it provides for a predefined control signal for a certain term that is at least as long as the term of the initialization phase of the used micro-controller. Through this the required time for the initialization of the micro-controller is saved. In the outlined example a voltage of 0V is immediately given out on line 12 in order to turn on the switch SW when the circuit layout 10 is turned on.

d) Circuit block 16 should be designed in a way that it carries out each time the same bridging function even with a repeated process to start the motor.

Figure 2:
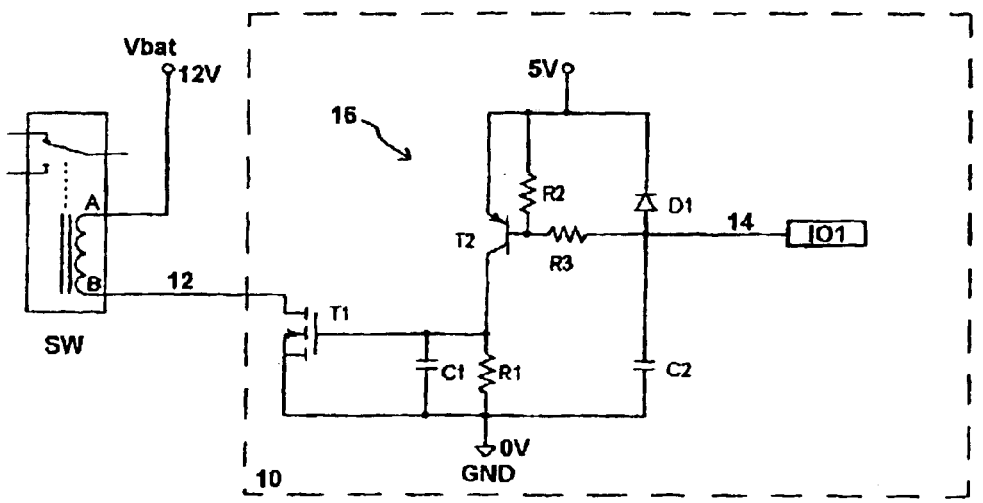
FIG. 2 depicts the circuit layout shown in FIG. 1 in order to explain the function of the circuit block to provide for a control signal.

FIG. 2 shows again the already described circuit layout 10 referring to FIG. 1 wherein the design of the circuit block is outlined in detail whereas other circuit parts (not essential to understand the function of circuit block 16) are left out. These left-out circuit parts are in this example are shown in FIG. 1.

Circuit block 16 is designed as follows. A 5V supply terminal (=output of voltage regulator 18) is connected to the emitter of a bipolar transistor T2 (pnp), a first terminal of a resistor R2 and the cathode of a diode D1. A second terminal of resistor R2 is connected to the anode of diode D1 via a resistor R3. This anode is further connected to the output I01 of the micro-controller MC and a first terminal of a capacitor C2. The second terminal of this capacitor C2 is connected to the ground terminal GND (0V). The collector of transistor T2 is connected to the gate of a MOS-FET T1, a first terminal of a capacitor C1 and a first terminal of a resistor R1. The source of T1, the second terminal of C1 and the second terminal of R1 are also connected to the ground terminal GND. The drain of T1 is connected to line 12.

The circuit layout 10 functions as described in the following. When the ignition is turned on, the circuit layout 10 is supplied with the battery voltage of 12V via the supply terminal Vbat' (ignition lock contact). The output voltage of the voltage regulator 18 rises quickly from 0V to 5V. This 5V operating voltage is supplied to the micro-controller MC and the circuit block 16. The micro-controller stays during the term of its initialization phase still in a reset condition in which the output signal on output I01 is not defined. In the outlined example the micro-controller MC provides for a so-called tri-state-output signal (0V, 5V, high resistance). At this time capacitor C2 is discharged and is slowly charged to 5V via R3 and the parallel connection of R2 and the base emitter diode of T2. Deviating from the outlined example T2, R2 and R3 can be combined in one single component ("logic transistor"). The part of the current that flows into the base of T2 turns on T2 for a certain period of time so that a current also flows over the collector of T2 during this time and charges capacitor C1 from 0V to 5V. T1 turns on when this voltage on capacitor C1 exceeds the threshold voltage of T1. In the outlined example T1 is a MOS-FET with a threshold voltage of approx. 2.5V. Therefore the switch SW turns on the fuel pump.

The normal operation of the circuit layout 10 starts when the micro-controller MC ends its initialization phase and triggers the voltage level on capacitor C2 to 0V via its output I01. Therefore T2 stays turned on. The voltage on C1 remains at 5V and also T1 is still turned on. Therefore the fuel pump switch SW is still turned on. In this condition the output signal of the micro-controller MC defines the control signal for the switch SW.

When the ignition is turned off again, i.e. no more operating voltage is supplied to the supply terminal Vbat', also the voltage on the output of the voltage regulator 18 breaks down and micro-controller MC goes to its reset condition in which output I01 becomes high-resistive. Then C2 is charged via R2 and R3 whereupon T2 locks after a short delay. C1 is slowly discharged via R1 until the gate voltage T1 falls below the threshold voltage and therefore locks T1. The fuel pump switch SW turns off. C2 is discharged via diode D1 in order to ensure that T2 can be turned on again when the ignition is turned on again. This restores the initial condition. A possible low remaining voltage on C1 is without any importance.

When the ignition is turned on, T2 is only conductive for a short time in order to charge the capacitor C1 in this process of turning on the ignition (as described above). Then T2 turns off again. In this moment a slow discharge of C1 via resistor R1 starts so that the voltage on the gate of T1 slowly falls. The threshold voltage of T1 would fall short after approx. 200 ms and therefore the transistor T1 would be turned off. Normally the micro-controller MC ends its initialization within a time of approx. 50 ms and timely takes over the triggering via its output I01 and line 14 before the threshold voltage on T1 is fallen short. If the battery voltage falls to 3V, for example when the motor is started at low temperature, a reset for the micro-controller MC is triggered. The reset condition is remained until the supplied battery voltage via the supply terminal Vbat' has reached 6V again and the required 5V to operate the micro-controller MC can be supplied on the output of the voltage regulator 18. During this term T1, driven by the voltage on C1, remains turned on. The undervoltage phase is bridged through the circuit block 16 so that the fuel pump switch SW remains turned on. When the micro-controller MC timely starts its operation after the end of the undervoltage phase, it will set its output I01 to 0V so that T1 is still turned on.

In other words: Additional control signals are generated that maintain the control signal generated by a digital control unit for a predetermined period of time in case the digital control unit breaks down due to a too low operating voltage (reset condition). These "help signals" maintain the last control signal from the digital control unit as long as this control unit is in the reset condition. The help signals go back to a "quiescent condition" when the control unit remains longer than for a predetermined period of time in the reset condition.

Figure 3:
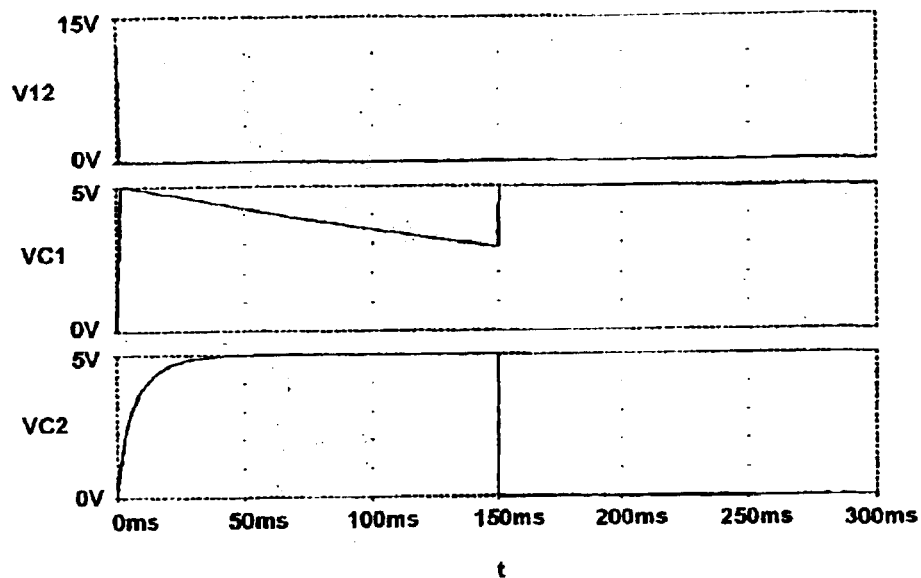
FIG. 3 depicts the chronological courses of some voltages in the operation of the circuit layout in accordance with FIGS. 1 and 2 with the proper function of a micro-controller used in the circuit layout.

FIG. 3 illustrates the behavior of the circuit layout 10 for an undervoltage term of 100 ms (between approx. 0 s and 100 ms) with a timely takeover of the control through the micro-controller (at 150 ms). The top of FIG. 3 shows the course of the voltage V12 on line 12. This voltage quickly falls from 12V to 0V when the ignition is turned on (turning on the fuel pump). The center of FIG. 3 shows the course of the voltage VC1 on the gate of T1 (=voltage on capacitor C1). This voltage quickly rises from 0V to 5V when the ignition is turned on and then it slowly falls. This falling occurs until a time of approx. 150 ms. At this time the micro-controller MC takes over the control. Turning on the transistor T2 leads to a quick rising of the voltage VC1 to 5V. The bottom of FIG. 3 shows the course of the voltage VC2 on capacitor C2. This voltage VC2 rises when the ignition is turned on so that C2 is practically completely charged after 50 ms. It is essential that at that time the charging process for capacitor C1 is already completed. When the micro-controller MC again takes over the control at approx. 150 ms, the voltage VC2 quickly falls again to 0V. Then this is the output voltage on output I01 provided by micro-controller MC.

Figure 4:
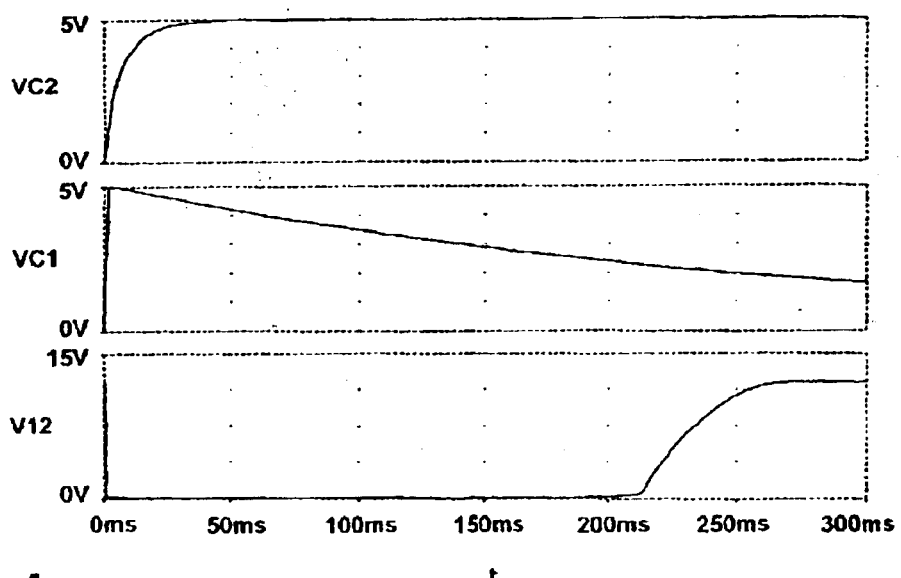
FIG. 4 depicts the chronological courses of some voltages similar to FIG. 3, but with a failure in the micro-controller.

FIG. 4 illustrates the behavior of the circuit layout 10 in case of a failure in the micro-controller MC which causes that the micro-controller does not timely end its reset condition. The top of FIG. 3 again shows the voltage VC2 on capacitor C2 that remains in this case at 5V even above the time of 150 ms, because the micro-controller MC does not determine this voltage at this time. The center of FIG. 4 again shows the voltage VC1 on capacitor C1 that continues to fall after the time of 150 ms and finally falls short of the threshold voltage of C1 at a time of approx. 200 ms. The bottom of FIG. 4 again shows the voltage V12 on line 12 which slowly rises in this case to 12V at approx. 200 ms, because the falling short of the threshold voltage of T1 causes the turning-off of this transistor. Through this turning-off of T1 an uncontrolled operation of the fuel pump is prevented.

Figure 5:
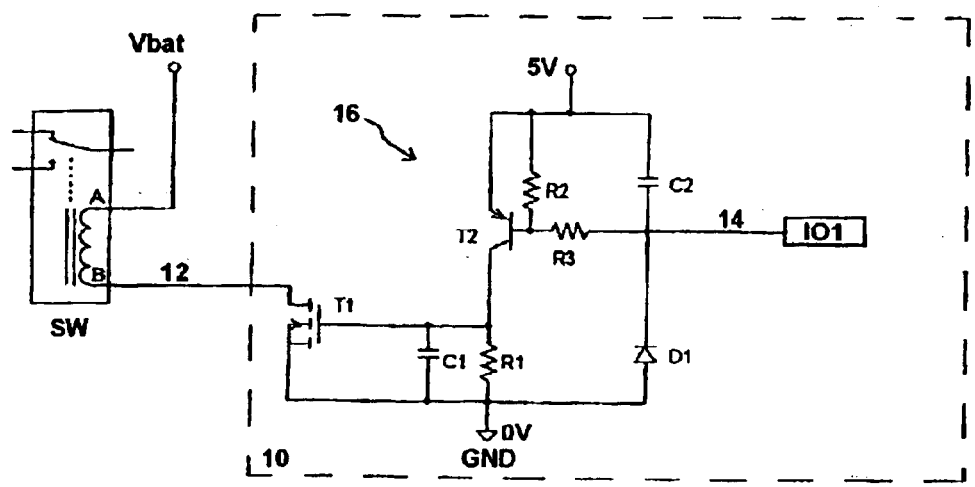
FIG. 5 depicts, corresponding to FIG. 2, a second (modified) embodiment.

FIG. 5 shows an alternative embodiment of the circuit layout 10. This second embodiment is provided to trigger electrical components that are supposed not to be immediately triggered through a predefined control signal when the ignition is turned on, but only through the output signal determined by the micro-controller.

FIG. 5 shows that the positions of C2 and D1 are exchanged. C2 is not connected to the mass terminal GND but to the supply terminal (5V). When the ignition and therefore the 5V supply is turned on, C2 is not charged but remains discharged. Then no current flows over the emitter-to-base system of T2 at that time and T2 remains locked. Accordingly T1 is not charged and T1 does not turn on.

Only when the micro-controller MC sets via its output I01 line 14 on a level 0V after the end of its initialization phase, T2 and T1 are turned on and the switch SW is actuated.

Also in this example, the advantageous feature of bridging an undervoltage phase is maintained. In case a reset for the micro-controller MC is triggered due to an undervoltage of the electrical system, the circuit block 16 bridges this condition. The last output signal determined by the micro-controller MC is maintained for a period of time that is defined through C1, R1 and the threshold voltage of T1.

Of course the described examples are to be understood as not restrictive. Numerous modifications are obvious for experts that can be made on these examples without leaving the framework of the invention. It is for example not absolutely necessary that a voltage transformer is provided as a part of the described circuit layout. Such a voltage transformer could rather be provided on a different location of the vehicle electronics. The circuit block and/or the micro-controller could be directly operated with the electrical system. The micro-controller can show a multitude of control outputs and also a multitude of inputs, especially to detect sensor signals. Although only one control output (I01) is present in the described examples and only one assigned circuit block 16 is present, it could be alternatively provided that several control outputs of a majority of control outputs are each equipped with a circuit block to maintain the relevant output signal during an undervoltage phase.

We claim:

1. Circuit layout to control at least one electrical component of a motor vehicle via a control signal supplied to this component, wherein the circuit layout comprises a digital control unit that provides in its operation on an output of the digital control unit for an output signal for providing the control signal, the circuit layout has a supply terminal to set up an operating voltage that is provided by a power supply unit of the motor vehicle, the digital control unit is designed in a way that it starts its operation when an operating voltage above a predetermined threshold value occurs on the supply terminal and that it ends its operation when an operating voltage below the threshold value occurs on the supply terminal, the circuit layout comprises a circuit block connected with the output of the digital control unit in order to provide for the control signal, and the circuit block is designed in a way that it provides for the control signal based on the output signal of the digital control unit when the digital control unit is in operation and that it maintains the momentary control signal for a predetermined period of time when the operation of the digital control unit is ended.

2. Circuit layout according to claim 1 wherein a relay or a magnetic actuator of the motor vehicle is provided as the electrical component.

3. Circuit layout according to claim 1 wherein a binary signal to turn the electrical component on and off is provided as the control signal.

4. Circuit layout according to claim 1 wherein the digital control unit functions program-controlled.

5. Circuit layout according to claim 1 wherein the digital control unit is designed in a way that it starts its operation only at the end of an initialization phase and wherein the term of the predetermined period of time is provided to be longer than the term of the initialization phase.

6. Circuit layout according to claim 5 wherein the circuit block is designed in a way that in case the operating voltage exceeds the threshold value a predefined control signal is provided for a term that is at least as long as the term of the initialization phase.

7. Circuit layout according to claim 1 wherein the power supply unit is built up from a starter battery of a motor vehicle or from a connected engine-start switch unit.

8. Circuit layout according to claim 1 wherein the circuit block provides for the control signal on a channel terminal of a FET whose gate voltage is controlled via the output signal of the digital control unit.

9. Circuit layout according to claim 8 wherein a capacitor with a parallel connected discharge passage is provided on the gate terminal of the FET in order to provide for the gate voltage during the predetermined period of time.

10. Procedure to control at least one electrical component of a motor vehicle via a control signal supplied to this component, comprising:

Operation of a digital control unit for providing the control signal via an output signal of the digital control unit that starts its operation when a power supply unit of the motor vehicle provides for an operating voltage above a predetermined threshold value and that ends its operation when an operating voltage below the threshold value is provided, Input of the output signal to a circuit block, and Providing for the control signal via the circuit block that provides for the control signal based on the output signal of the digital control unit when the digital control unit is in operation and that it maintains the momentary control signal for a predetermined period of time when the operation of the digital control unit is ended.

11. Circuit arrangement for controlling at least one electrical component of a motor vehicle via a control signal supplied to this component, comprising:

a digital control unit for providing an output signal for the control signal, a supply terminal to be fed with an operating voltage that is provided by a power supply unit of the motor vehicle, wherein the digital control unit comprises threshold means for determining a start and an end of its operation, and a circuit block connected with the output of the digital control unit in order to provide for the control signal, wherein the circuit block comprises means for providing a control signal based on the output signal of the digital control unit and timing means for maintaining the momentary control signal for a predetermined period of time.

12. Circuit arrangement according to claim 11, further comprising a relay or a magnetic actuator of the motor vehicle as the electrical component.

13. Circuit arrangement according to claim 11, wherein a binary signal to turn the electrical component on and off is used as the control signal.

14. Circuit arrangement according to claim 11, wherein the digital control unit functions program-controlled.

15. Circuit arrangement according to claim 11, wherein the digital control unit comprises means for starting its operation only at the end of an initialization phase and wherein the term of the predetermined period of time is provided to be longer than the term of the initialization phase.

16. Circuit arrangement according to claim 11, wherein the circuit block is designed in a way that in case the operating voltage exceeds the threshold value a predefined control signal is provided for a term that is at least as long as the term of the initialization phase.

17. Circuit arrangement according to claim 11, wherein the power supply unit is built up from a starter battery of a motor vehicle or from a connected engine-start switch unit.

18. Circuit arrangement according to claim 11, wherein the circuit block provides the control signal on a channel terminal of a FET whose gate voltage is controlled via the output signal of the digital control unit.

19. Circuit arrangement according to claim 18, wherein a capacitor with a parallel connected discharge passage is provided on the gate terminal of the FET in order to provide the gate voltage during the predetermined period of time.

20. Method for controlling at least one electrical component of a motor vehicle via a control signal supplied to this component, comprising the steps:

operating a digital control unit for providing a control signal via an output signal of the digital control unit that starts its operation when a power supply unit of the motor vehicle provides for an operating voltage above a predetermined threshold value and that ends its operation when an operating voltage below the threshold value is provided, feeding the output signal to a circuit block, providing the control signal via the circuit block that provides for the control signal based on the output signal of the digital control unit when the digital control unit is in operation and that it maintains the momentary control signal for a predetermined period of time when the operation of the digital control unit is ended.

* * * * *